United States Patent [19]
Greer

[11] Patent Number: 5,632,147
[45] Date of Patent: May 27, 1997

[54] SOLAR POWERED STEAM TURBINE GENERATOR

[76] Inventor: William Greer, 1811 S. 39th St., #50, Mesa, Ariz. 85206

[21] Appl. No.: 629,835

[22] Filed: Apr. 10, 1996

[51] Int. Cl.$^6$ .................................................. F03G 6/02
[52] U.S. Cl. ............................. 60/641.15; 60/669
[58] Field of Search ................. 60/641.15, 669; 416/20 R, 21

[56] References Cited

U.S. PATENT DOCUMENTS

| | | |
|---|---|---|
| 47,636 | 5/1865 | Harris . |
| 784,005 | 2/1905 | Ketchem . |
| 1,002,768 | 9/1911 | Shuman . |
| 1,302,363 | 4/1919 | Graham . |
| 1,989,999 | 2/1935 | Niederele . |
| 3,203,167 | 8/1965 | Green . |
| 3,654,759 | 4/1972 | Abbot .................................. 60/26 |
| 3,822,692 | 7/1974 | Demarest ............................ 126/271 |
| 3,965,683 | 6/1976 | Dix ..................................... 60/641 |
| 4,047,385 | 9/1977 | Brinjevec ............................ 60/641 |
| 4,205,657 | 6/1980 | Kelly .................................. 126/425 |
| 4,213,303 | 7/1980 | Lane ................................... 60/641 |
| 4,284,063 | 8/1981 | Watson .............................. 126/425 |
| 4,391,100 | 7/1983 | Smith ................................. 60/641.11 |
| 4,622,949 | 11/1986 | Yahalom ........................... 126/415 |
| 4,945,731 | 8/1990 | Parker ............................... 60/641.15 |
| 5,408,824 | 4/1995 | Schlote ............................. 416/21 |

Primary Examiner—Ira S. Lazarus
Assistant Examiner—Alfred Basichas
Attorney, Agent, or Firm—LaValle D. Ptak

[57] ABSTRACT

A solar steam generator has a hollow steam rotor mounted for rotation in a closed compartment located within a larger housing. The rotor is made of heat conductive material and is supplied with water or other working fluid through an inlet at its central hub. A plurality of steam jet outlets are located around the periphery of the rotor; and they are oriented to cause the rotor to spin as the water or working fluid inside is heated to a boiling temperature. To cause the fluid in the rotor to boil, Fresnel lenses, located in an open end of the housing, focus heat from the sun onto the rotor and the chamber in which it is located. Steam and fluid which exit from the nozzles is recovered in the sealed chamber and is returned through a condenser-reservoir, from which it is supplied back to the water inlet of the rotor.

20 Claims, 1 Drawing Sheet

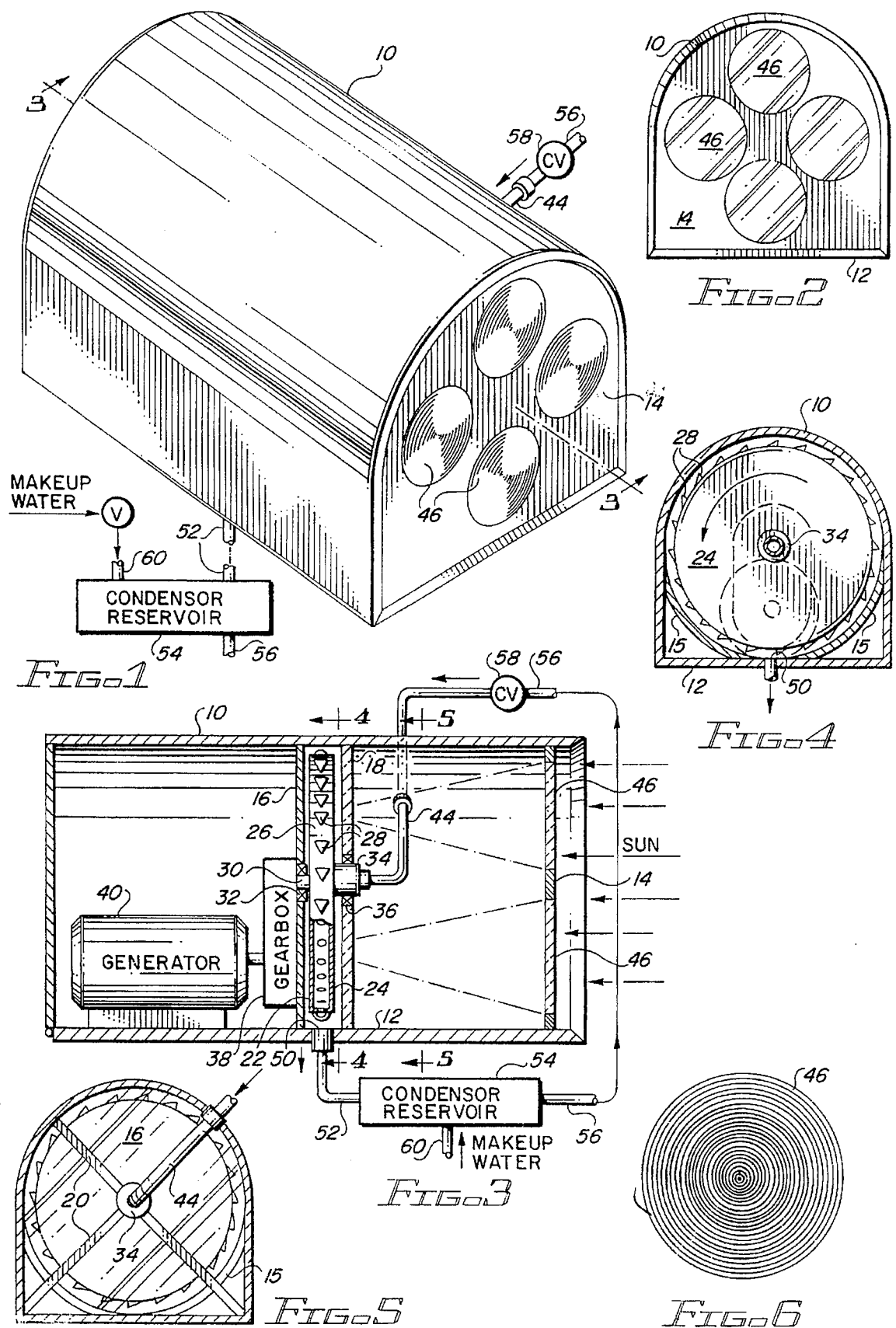

5,632,147

SOLAR POWERED STEAM TURBINE GENERATOR

BACKGROUND

The availability of unlimited solar energy, in the form of solar radiation and heat, is an attractive source of energy for many purposes. Many applications for harnessing or using solar radiation to generate electricity or a useful mechanical output exist. For example, silicon solar cells which respond to light from the sun are used to generate electricity, which then may be used directly or stored by charging a battery. Typically, solar cells generate only small amounts of electricity; so that solar cell systems generally are used to operate electronic devices requiring relatively low power levels.

Solar cell arrays many square feet in size have been used to power direct current motors to operate pool pumps and the like. Typically, however, solar cell arrays need to be extremely large in order to produce any substantial quantity of electricity. As a result, such solar cell arrays have not been found to be a practical source for utilizing energy from the sun, in all but a few specialized cases.

Another approach to harnessing the energy of the sun is to focus the solar radiation through a lens system onto a contained boiler to generate steam. The steam then may be utilized to turn a rotor, which operates an electric generator.

Systems have been developed for utilizing solar energy in a closed loop sealed system to generate electric power. One such system is disclosed in the Parker U.S. Pat. No. 4,945,731. The Parker patent discloses a heat cycle engine in the form of a hollow cylindrical container enclosing a working fluid in the form of a radiant energy absorber. A window is disposed in the first end of the container to receive solar energy, which is concentrated on the window from a parabolic reflector. The working fluid is heated in the area behind the window, and then travels toward the opposite end of the container to operate a turbine. The cooled fluid then returns back to the end adjacent the window on a continuous basis. The turbine located within the container is coupled through a magnetic coupling to an external shaft, which may be used to drive an electric generator. The system of this patent uses specialized working fluid selected from halogens and interhalogens; and the system is relatively complex and expensive to manufacture.

Another type of closed loop, hermetically sealed solar power generator is disclosed in the patent to Smith U.S. Pat. No. 4,391,100. The Smith patent discloses a closed loop, sealed, recirculatory water solar powered generator which has a hollow globular water boiler with a focusing lens in it. Solar energy is reflected onto the lens from a parabolic mirror; and the heat then is focused on the water inside the boiler. Steam is generated and is obtained from the top of the boiler to drive a steam turbine. The water then passes through a condenser to a reservoir, from which it returns back to the boiler. The boiler and the steam turbine are separate parts in this system; but the system of Smith is of more simple construction than the system of the Parker patent and uses a readily available, inexpensive working fluid in the form of water.

Another system of the same general type as the one disclosed in the Smith patent is disclosed in the patent to Lane U.S. Pat. No. 4,213,303. This patent is directed to a sun tracking, solar energy boiler using a lens system to heat a small tube of water to create steam. The steam then is used to drive a turbine, the shaft of which is coupled to an electric generator to produce useful output energy. The condensed steam then is supplied back to a condenser and reservoir, from which it is supplied again to the boiler tube.

A different system for converting solar energy to low cost mechanical or electrical power is disclosed in the Abbot U.S. Pat. No. 3,654,759. The Abbot patent divides a reflected solar input beam into a plurality of concentrated cones of solar radiation through the use of a Fresnel lens array. Each of these cones of concentrated radiation then is focused on a relatively thin black box to heat air contained within the box. When a suitable pressure is built up within a box, the heated air is passed outwardly through a valve and to a nozzle directed to a turbine to rotate the turbine. The different boxes are opened and closed at different times to admit air into the boxes, and then to release the pressurized heated air from the boxes in a timed sequence to continuously apply jets of heated air to different portions of the rotor to rotate it. The mechanical motion of the rotor then is used to produce electrical energy.

The foregoing systems of the prior art all include various disadvantages. The Abbot system is not a closed system, and therefore is subject to variations in the supply of ambient air used in the system. Clearly, the greater the temperature differential between the air entering into the boxes and that to which the air is heated by the lens system, the greater the power output from the Abbot system. Therefore, it is desirable to separate, to as great a degree as possible, the output nozzles used to drive the turbine from the location of the input air to the boxes. The other patents, which have been discussed above, all are relatively complex in the number of components and in the array of lenses and specialized boilers which must be incorporated.

It is desirable to provide a solar powered steam turbine generator which is efficient in operation, which overcomes the disadvantages of the prior art, and which is simple and inexpensive to manufacture.

SUMMARY OF THE INVENTION

It is an object of this invention to provide an improved solar powered energy converter.

It is another object of this invention to provide an improved solar powered steam turbine system.

It is an additional object of this invention to provide an improved solar powered steam turbine where the steam is generated directly within the turbine itself.

It is a further object of this invention to provide a solar powered, self-contained, closed loop steam turbine generator.

In accordance with a preferred embodiment of this invention, a system for converting solar radiation to useful energy comprises a thin, hollow rotor made of heat conductive material, mounted for rotation about its axis in a housing. The rotor has a plurality of outlet jets located about the periphery, oriented to cause rotation of the rotor when steam issues from the outlet jets. Working fluid is supplied to an inlet in the rotor; and a lens is mounted in the housing to focus solar radiation on the rotor to heat the working fluid therein. This produces steam or expanded working fluid within the rotor, which issues from the outlet jets to cause rotation of the rotor.

BRIEF DESCRIPTION OF THE DRAWING

FIG. 1 is a perspective view of the exterior of a preferred embodiment of the invention;

FIG. 2 is an end view of the embodiment shown in FIG. 1;

FIG. 3 is a cross-sectional view taken along the line 3—3 of FIG. 1;

FIG. 4 is a cross-sectional view taken along the line 4—4 of FIG. 3;

FIG. 5 is a cross-sectional view taken along the line 5—5 of FIG. 3; and

FIG. 6 is a detail of a portion of one of the features of the embodiment specifically shown in FIGS. 1 and 2.

DETAILED DESCRIPTION

Reference now should be made to the drawing, in which the same reference numbers are used throughout the different figures to designate the same components. FIG. 1 is a top front perspective view of a preferred embodiment of the invention, in the form of a system for converting solar radiation to useful energy. As shown in FIG. 1, a housing has a semi-cylindrical curved top and a flat bottom 12, with an open end in which is a mounting plate 14. The mounting plate 14, in turn, has four Fresnel lenses 46 uniformly located about a central axis of the cylinder from which the top 10 forms a section. This is seen most clearly in FIG. 2.

As indicated most clearly in FIG. 3, the housing 10, 12 also includes a short semi-cylindrical section having a bottom 15, which comprises a continuation of the curve of the top 10 (as shown most clearly in FIG. 4). This section 15 is enclosed by two end plates 16 and 18. The plate 16 preferably is made of metal, whereas the plate 18 may be made either of heat conductive material, such as metal, or it may comprise a glass plate having a circular opening at its center, through which a hub 34 mounted in a bearing 36 is located. If a glass plate 18 is used, a metal support brace configuration 20, as shown in FIG. 5, may be used to support the hub 34 and bearing 36 relieving stress from the glass of the plate 18. A seal is made between the bearing 36 and the plate 18; and a similar seal is made on the opposite side in the plate 16 to support a bearing 32 for an output shaft 30. Thus, the plates 16 and 18 and section 15 form a closed, hermetically sealed chamber within the housing 10.

The shaft 30 is attached to a rear circular plate 22 of a hollow rotor, the opposite face of which comprises a circular plate 24. The plate 24 is parallel to and faces the support plate 18 in the housing 10, 12. In the partially cut-away view of the rotor shown in FIG. 3, it may be seen that the rotor is relatively thin in a transverse direction compared to the diameter of the end plates 22 and 24. The periphery or circumference of the rotor is covered by a rim 26, through which a plurality of steam jet nozzles 28 are formed. The nozzles 28 all are oriented to direct steam exiting from the interior of the rotor 22, 24, 26, in a generally tangential direction to cause rotation of the rotor when steam under pressure issues from the nozzles formed in the ends of the outlet jets 28.

An inlet for working fluids, typically water, is provided through the center of the hub 34 through an inlet pipe 44, which communicates directly with the rotor interior to supply working fluid to the rotor 22, 24, 26 located within the housing 10 and inside the compartment or chamber formed by the end plates 16 and 18.

The system is completed by providing a drain 50 through the bottom 12 and the semi-cylindrical section 15 to remove spent steam and water accumulating within the interior of the chamber formed by the plates 16 and 18. This spent steam and water passes through an outlet pipe 52 into a condenser/reservoir 54, which in turn is connected through a pipe 56 and a check valve 58 to the inlet pipe 44. This forms a closed loop, sealed system. At such time as initial working fluid or make up fluid (such as water) is required, the fluid is supplied through a pipe 60, as shown in FIGS. 1 and 3.

In operation, the open end of the housing 10, which is closed with the panel 14 having the Fresnel lenses 46 in it, is oriented to receive direct solar radiation from the sun. To do this, solar tracking devices (not shown) may be employed to optimize the operation of the system which is shown in FIG. 3. Any standard tracking system may be employed for this purpose.

The sun radiation passes through the Fresnel lenses 46, as shown in FIG. 3, which then focus the radiation onto or through the plate 18 and onto the front flat circular panel 24 of the rotor. This focused solar radiation causes a substantial heating of the working fluid within the rotor, causing its expansion, and, in the case of water, causing the water to boil, producing steam. The expanded fluid and/or steam then is expelled under pressure through the nozzles 28 to spin the rotor in the direction of the arrow shown in FIG. 4. The output shaft 30 of the rotor is connected through a gear box 38 (FIG. 3) to drive an electrical generator 40, thereby producing useful electrical output from the system.

As the steam and expanded heated working fluid exits under pressure from the nozzles 28, it is collected at the drain 50 and is supplied back to the reservoir 54, as described above. A check valve 58 in the system prevents the pressurized working fluid/steam buildup within the rotor interior from flowing back in the opposite direction through the inlet pipe 44. If the working fluid is water, the orifices in the steam jet nozzles 28 ideally have an internal diameter of from approximately 0.001 inches to 0.003 inches to prevent leakage of unheated or unpressurized working fluid or water from the nozzles 28 when the system is first started up, or when it is not in use. A small of amount of leakage can be tolerated; but by choosing the nozzle diameters to be within this range, optimum operation of the system is attained. Variations of the nozzle size and the number of nozzles 28 relative to the internal volume of the rotor 22, 24, 26 may be effected to optimize the operating conditions of the system for any particular application.

Ideally, the rotor is made of heat-conductive materials, such as copper, and the end plates 22 and 24 are made to be as thin as possible. In addition, the chamber formed between the support plates 16 and 18 is hermetically sealed and, preferably, is made to impede outward heat transfer through these plates into the other interior portions of the housing 10, 12. The plate 16 may be made of insulating material, since no heat rays or concentrated light rays from the solar energy need to pass through this plate. The plate 18, as described above, may be made of heat-conductive metal or transparent glass, as desired.

Typically, the focal length of the Fresnel lenses 46 for a relatively small generator is approximately 10 inches, with the diameter of the lenses 46 for such an arrangement being on the order of 4 inches. Obviously, larger lenses, and an increased number of lenses 46, may be employed for larger installations capable of generating more power.

Although the output of the rotor 22, 24, 26 has been indicated as applied to drive an electric generator 40, this rotational output may be utilized in any other manner desired, since rotation of a shaft to obtain useful output is well known for a variety of different applications.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A system for converting solar radiation to useful energy including in combination:

a housing having at least a first end;

a hollow rotor having a central axis and made of heat conductive material, said rotor mounted for rotation about its axis in said housing, said rotor further having a plurality of outlet jets located about the periphery of said rotor and oriented to cause rotation of said rotor when steam issues from said outlet jets, and said rotor further having an inlet for supplying working fluid to the interior thereof;

a supply of working fluid coupled with the inlet of said rotor; and at least one lens mounted in said first end of said housing to focus solar radiation on said rotor to heat the working fluid therein, producing steam within said rotor whereby said steam issues from said outlet jets.

2. The combination according to claim 1 wherein said rotor is mounted in a hollow sealed compartment for containing steam and working fluid exiting from said nozzles; and an outlet from said compartment for recovering steam and working fluid exiting from said nozzles.

3. The combination according to claim 1 wherein said at least one lens comprises a Fresnel lens.

4. The combination according to claim 1 wherein said at least one lens comprises a plurality of Fresnel lenses mounted in the same plane in said first end of said housing.

5. The combination according to claim 1 wherein said plurality of said outlet jets are located at equal distance intervals about the periphery of said rotor.

6. The combination according to claim 1 wherein said inlet of said rotor is located on the central axis of said rotor.

7. The combination according to claim 1 wherein said inlet of said rotor is located on the central axis of said rotor.

8. The combination according to claim 7 wherein said plurality of said outlet jets are located at equal distance intervals about the periphery of said rotor.

9. The combination according to claim 1 further including an output shaft coupled with the central axis of said rotor; and an electric generator coupled with and powered by said output shaft.

10. The combination according to claim 9 wherein said at least one lens comprises a Fresnel lens.

11. The combination according to claim 9 wherein said at least one lens comprises a plurality of Fresnel lenses mounted in the same plane in said first end of said housing.

12. The combination according to claim 1 wherein said rotor is a circular rotor comprised of front and back circular plates the diameter of which is substantially greater than the axial thickness of said rotor.

13. The combination according to claim 12 wherein said rotor is mounted in a hollow sealed compartment for containing steam and working fluid exiting from said nozzles; and an outlet from said compartment for recovering steam and working fluid exiting from said nozzles.

14. The combination according to claim 13 further including a condenser reservoir coupled with said water outlet and further coupled with said inlet of said rotor for supplying working fluid to said inlet of said rotor.

15. The combination according to claim 14 further including an output shaft coupled with the central axis of said rotor; and an electric generator coupled with and powered by said output shaft.

16. The combination according to claim 15 further including a source of make up water for said condenser-reservoir.

17. The combination according to claim 15 wherein said at least one lens comprises a plurality of Fresnel lenses mounted in the same plane in said first end of said housing.

18. The combination according to claim 15 wherein said at least one lens comprises a Fresnel lens.

19. The combination according to claim 18 wherein said inlet of said rotor is located on the central axis of said rotor.

20. The combination according to claim 19 wherein said plurality of said outlet jets are located at equal distance intervals about the periphery of said rotor.

* * * * *